Oct. 11, 1966     W. M. GROVE     3,278,763
TWO DIODE BALANCED SIGNAL SAMPLING APPARATUS
Filed Aug. 23, 1965     2 Sheets-Sheet 1
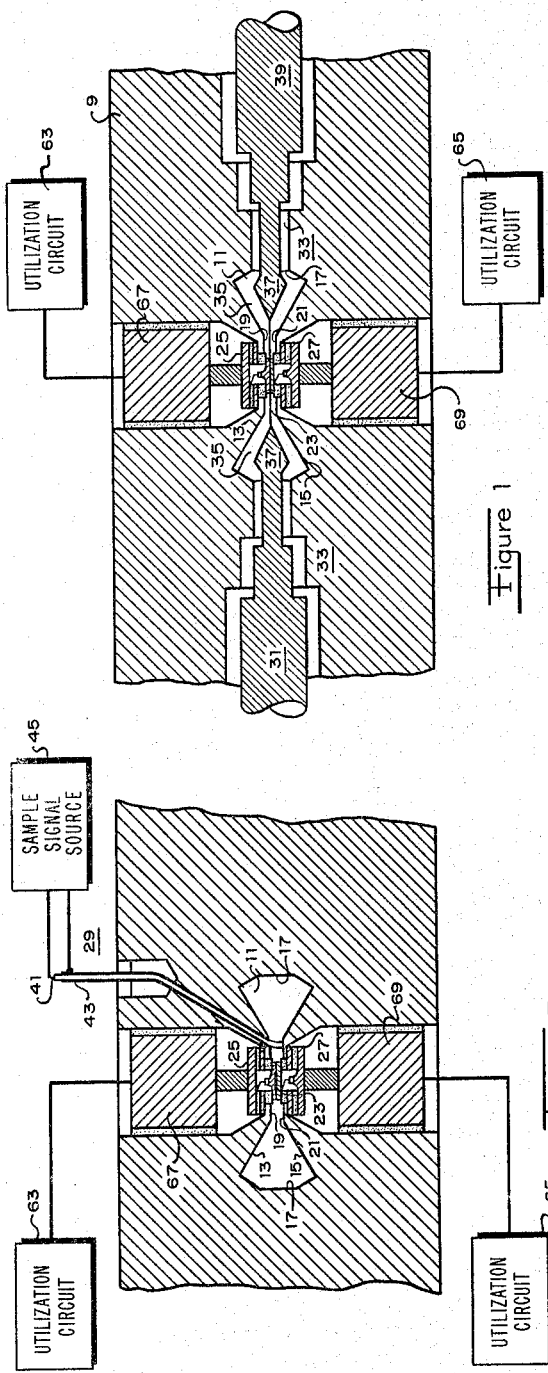
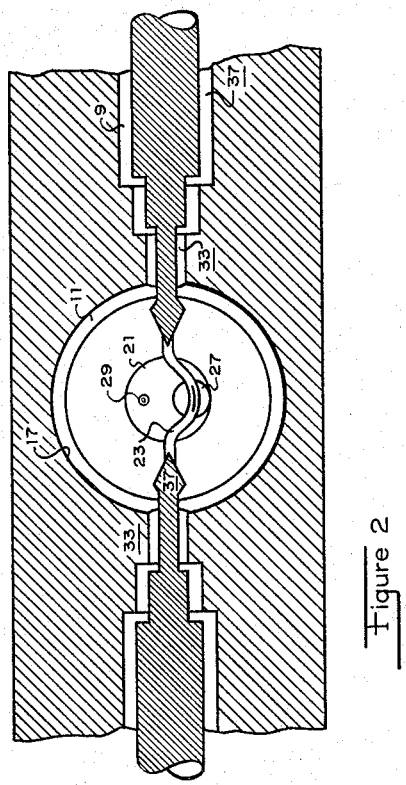
INVENTOR
WAYNE M. GROVE
BY    Q. C. Smith
ATTORNEY United States Patent Office 3,278,763
Patented Oct. 11, 1966

3,278,763
TWO DIODE BALANCED SIGNAL SAMPLING
APPARATUS
Wayne M. Grove, Palo Alto, Calif., assignor to Hewlett-Packard Company, Palo Alto, Calif., a corporation of California
Filed Aug. 23, 1965, Ser. No. 481,785
6 Claims. (Cl. 307—88.5)

This invention relates to signal sampling apparatus and more particularly to a balanced two-diode sampler which operates over a range of input signals from D.C. to over 12 kilomegacycles per second.

Certain known balanced samplers use shorted transmission lines to shape the sampling pulse applied to a pair of sampling diodes. Signal samplers of this type are shown and described in U.S. patent application Serial No. 265,767, filed on March 18, 1963 by K. B. Magleby et al., now Pat. No. 3,241,076. One disadvantage encountered in the operation of these devices is that the shorted transmission lines which differentiate the wavefront that is applied to the sampling diode from a pulse source radiate energy and cause a deterioration of the sampling pulse shape and amplitude. Also, the desired sampling pulse is distorted by the wavefront which propagates along the width of the conductors of the shorted transmission lines and reflects back from the open-circuit edges of these conductors.

Accordingly, it is an object of the present invention to provide balanced sampling apparatus which eliminates sample pulse radiation.

It is another object of the present invention to provide an improved two diode balanced sampler of signal-feed through design capable of operating from D.C. to more than 12 kilomegacycles per second.

It is still another object of the present invention to provide an improved sampling diode in a package which minimizes diode lead inductance and which includes a sample storage capacitor.

In accordance with the illustrated embodiment of the present invention, a pair of samping diodes are disposed at the apices of a pair of conductive inverted conical sections which have their perimeters of maximum diameter conductively coupled together. A sharp pulse wavefront applied to the apices initiates a sampling pulse which renders the sampling diodes conductive and which propagates radially outwardly on a radial-type transmission line having divergent conductors formed by the inverted conical sections. This wave reflects with inverted polarity from the conductive perimeter of the radial transmission line and returns to the diodes where it terminates the sampling pulse. The sampling diodes thus remain conductive for the duration of the sampling pulse the width of which is determined by the electrical length of the radial-type transmission line. The signal to be sampled is fed through the sampler along a conductor disposed between the apices of the conical sections in contact with the sampling diodes. The conical sections thus serve as the ground or reference conductor for the signal to be sampled and as the conductors of the radial-type transmission line which shapes the sampling pulse that is applied to the sampling diodes.

Other and incidental objects of the present invention will be apparent from a reading of this specification and an inspection of the accompanying drawing in which:

FIGURE 1 is a front sectional view of the sampler cavity showing the radial-type transmission line and the transitions from coaxial input and output lines to strip line between ground planes;

FIGURE 2 is a top sectional view of the sampler cavity in the plane of the strip line showing the arrangement of the sampling capacitor and sample pulse input connection near the center of the radial-type transmission line;

FIGURE 3 is a side sectional view of the sampler cavity showing the arrangement of the sample pulse input to the sampler cavity.

Figure 4:
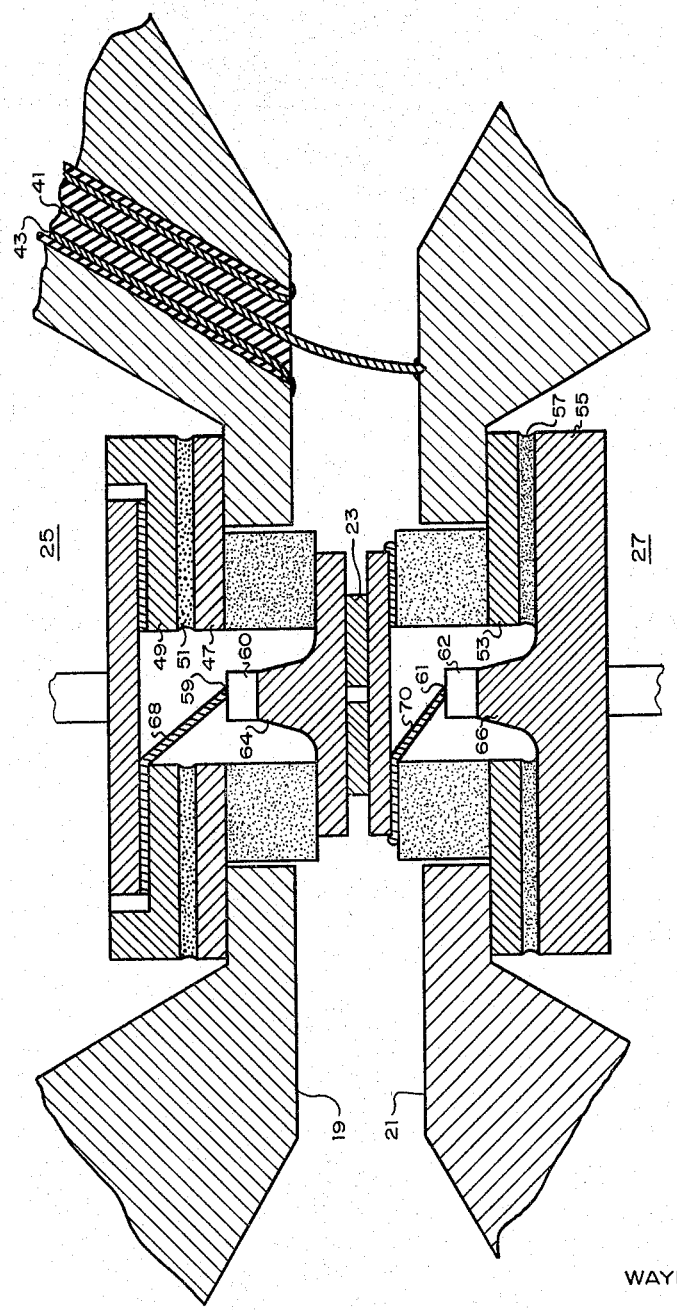
FIGURE 4 is a sectional view of an improved package for a sampling diode and sample storage capacitor.

Referring now to FIGURES 1 and 2, there is shown a sampler body 9 having a circular cavity 11 therein which is formed by the pair of inverted frusto-conical portions 13, 15 of the body 9. The conical portions form a radial-type transmission line for pulses originating near the apices of the conical portions. The term radial-type transmission line used herein is intended to include transmission lines formed by a pair of parallel circular plates, a circular plate and a circular divergent or cone-like conductor, a pair of circular divergent or cone-like conductors, and the like which support the radial propagation of electric waves. The radial-type transmission line formed by the truncated pair of conical portions has divergent conductors for maintaining a constant characteristic impedance over its radial length (except in the truncated region) and has a shorted periphery at the wall 17 of the cavity. The conical portions 13, 15 are truncated to provide planar surfaces 19 and 21 on which the sampling diodes 25, 27 and sampling pulse line may be located and also to provide ground planes for the strip line conductor 23. The conductor 29 terminates in the truncate area, as discussed below in connection with FIGURE 3, for introducing sampling pulses into the cavity 11. Ideally, the sampling pulses should be introduced at the center of the radial-type transmission line and the sampling diode and capacitor packages 25, 27 should also be located at the center of the radial-type transmission line. However, for practical reasons, the packages 25, 27 and sampling pulse coaxial line 29 are located off center, as shown in FIGURE 2, and the strip line conductor 23 bends away from the central axis to contact the upper and lower sampling diode and capacitor packages 25 and 27.

Signal to be sampled appearing at the input on a coaxial transmission line 31 passes through two transition rregions 33, 35 to the stripline conductor 23 between ground planes 19, 21, and thence through two identical transition regions to the output coaxial transmission line 39. The coaxial line transition regions 33 decrease the diameter of the center conductors of the input and output coaxial lines 31 and 39 to a size more compatible with the dimensions of components in the sampler cavity. Transition regions 35 include the conical tapers 37 connected to the center conductors of the input and output coaxial lines 31, 39 and the conical walls of the conical portions 13, 15 which serve as ground planes for the conical conductors 37. The characteristic impedance of the various types of transmission lines in the signal path through the sampler from input to output is maintained substantially constant to keep the standing wave ratio as low as possible. Since the signal path is identical in both directions, the signal to be sampled may be applied to the sampler from either side and terminated or utilized on the other side.

FIGURE 3 is a sectional view of the sampler cavity viewed in the direction of applied signal. A sample signal in the form of a sharp wave-front from source 45 is applied to the planar surfaces 19 and 21 in polarity opposition through the conductors 41 and 43 of coaxial line 29. The end of the outer coaxial conductor 43 within the cavity terminates at the planar surface 19 and the end of the inner conductor 41 within the cavity traverses the gap between the surfaces 19 and 21 and terminates at surface 21. A sharp wave-front from source 45 thus suddenly establishes a difference of potential at the ends of conductors 41 and 43 within the cavity, which potential difference propagates radially outwardly as a wave-front along the conical surfaces to the shorting peripheral wall 17 where the propagating wavefront reverses polarity and reflects radially inwardly toward the apices of the conical sections. The reflected wavefront cancels the initiating or incident wavefront, leaving zero potential difference across the planar surfaces 19, 21. The potential difference across these surfaces provides the desired sampling pulse of pulse width at the base thereof which is equal to the two-way propagation time of the shorted radial-type transmission line. The surfaces of the conical sections 13 and 15 thus serve as the conductors of a radial transmission line for the sampling pulse and also serve as the ground plane for the signal to be sampled passing through the sampler. It should be noted that since the conductors of the transmission line are pulsed in opposite polarity by a source 45, conductor 23 in a zero-potential plane equidistant between the conductors 13, 19 and 15, 21 of the transmission line is unaffected by the sampling pulse so that signal to be sampled on conductor 23 does not "see" the sampling pulse and hence, does not show a sampling pulse component in the input or output lines 31, 39.

In operation, source 45 pulses the conductors 13, 19 and 15, 21 of the radial-type transmission line with a step of voltage having a rise time of the order of 60 picoseconds. This initiates a sampling pulse at the center of the transmission line which is capacitively coupled to the sampling diodes in the packages 25, 27. Referring to FIGURE 4, this capacitive coupling is provided by the conductive elements 47 and 49 of package 25 separated by insulator 51 and by conductive elements 53 and 55 of package 27 separated by insulator 57. The sampling diodes 59, 61 are poled in the same current-conducting direction and each includes a wafer 60, 62 of semiconductor material mounted on a conductive base 64, 66 and an electrode 68, 70 contacting the upper surface of the wafer 60, 62. The sampling pulse appearing on the conductors of the transmission line is thus conducted through the serially-connected sampling diodes 59 and 61 during the portion of the two-way propagation time of the voltage step along the transmission line during which the amplitude of the sample pulse exceeds any bias level on the sampling diodes. The charges deposited on coupling capacitors 47–51 and 53–57 during the sampling pulse period are equal and are of opposite polarity in the absence of signal to be sampled appearing on strip line conductor 23 and are unequal by a value related to the instantaneous amplitude of the signal to be sampled appearing on conductor 23 during the sampling pulse period. The common-mode charge on these two capacitors may be detected to provide an output related to the sampled amplitude of the applied signal by external circuitry 63, 65 connected to one electrode of the sampling capacitors through resistors 67, 69 or the like, as shown in FIGURE 1.

I claim:

1. Apparatus for sampling an applied signal comprising:
    a pair of conductors forming a radial-type electric wave transmission line;
    means shorting said conductors together at the peripheral extent thereof;
    a signal conductor for receiving an applied signal disposed intermediate the conductors of said radial-type transmission line;
    non-linear signal conducting means having one terminal disposed in contact with the signal conductor near the center of said radial-type transmission line and having another terminal; and
    means including an energy storage element connected to a conductor of said radial-type transmission line and to said other terminal of said non-linear signal conducting means for applying thereto the signal appearing on said conductor of the radial-type transmission line.

2. Apparatus for sampling an applied signal comprising:
    a pair of conductors forming a radial-type electric wave transmission line having radially outwardly diverging conductors;
    means shorting said conductors together at the peripheral extent thereof;
    a pair of coaxial conductors forming an input and another pair of coaxial conductors forming an output;
    means connecting together the outer conductors of the input and output pairs of conductors and the conductors forming the radial-type transmission line;
    a signal conductor for receiving an applied signal disposed intermediate the conductors of said radial-type transmission line and connected to the inner conductors of the input and output pairs of coaxial conductors;
    non-linear signal conducting means having one terminal disposed in contact with the signal conductor near the center of said radial-type transmission line and having another terminal; and
    means including an energy storage element connected to a conductor of said radial-type transmission line and to said other terminal of said non-linear signal conducting means for applying thereto the signal appearing on said conductor of the radial-type transmission line.

3. Apparatus for sampling an applied signal comprising:
    a pair of inverted truncated biconical conductors forming the conductors of a radial-type electric wave transmission line;
    means shorting said conductors together at the peripheral extent thereof;
    a signal conductor for receiving an applied signal disposed intermediate the conductors of said radial-type transmission line;
    non-linear signal conducting means having one terminal disposed in contact with the signal conductor near the center of the truncate area of the conductors of said radial-type transmission line and having another terminal; and
    capacitive means connecting a conductor of said radial-type transmission line to said other terminal of said non-linear signal conducting means for applying thereto the signal appearing on said conductor of the radial-type transmission line.

4. Apparatus for sampling an applied signal comprising:
    a pair of inverted right frustoconical conductors forming the conductors of a radial-type electric wave transmission line;
    means shorting said conductors together at the peripheral extent thereof;
    a signal conductor for receiving an applied signal disposed intermediate the conductors of said radial-type transmission line;
    non-linear signal conducting means for each of the conductors of the transmission line, each having one terminal disposed in contact with the signal conductor near the center of the truncate area of the corresponding conductors of said radial-type transmission line and having another terminal;
    capacitive means for each of said non-linear signal conducting means connected to a corresponding conductor of said radial-type transmission line and to said other terminal of the corresponding non-linear signal conducting means for applying thereto the signal appearing on the corresponding conductor of the radial-type transmission line; and
    a pair of conductors for receiving a sharp wavefront signal, each of said conductors terminating at an electrical connection to a conductor of the transmission line near center of the truncate area thereof.

5. Apparatus as in claim 1 for sampling an applied signal wherein said means including an energy storage element comprises:
  a first conductive member disposed in contact with said conductor of the radial-type transmission line;
  a second conductive member disposed on one side of the first conductive member in contact with said signal conductor and insulated from said first conductive member;
  a third conductive member disposed on the opposite side of said first conductive member and insulated therefrom to form therewith said energy storage element; and
  said non-linear signal conducting means is connected between the second and third conductive members.

6. Apparatus as in claim 5 for sampling an applied signal, the apparatus comprising:
  another similar means including an energy storage element disposed on the opposite side of said signal conductor with the second conductive member of said other similar means in contact with the signal conductor; and
  the non-linear signal conducting means each show relatively high conductivity for signal flowing therethrough in a common direction from one such non-linear signal conducting means to the other non-linear signal conducting means.

References Cited by the Examiner

UNITED STATES PATENTS

| | | | |
|---|---|---|---|
| 2,246,188 | 6/1941 | Roder | 333—84 |
| 2,468,655 | 4/1949 | Cole et al. | 329—162 |
| 2,498,335 | 2/1950 | Hunt | 329—162 |
| 2,705,304 | 3/1955 | Fiet | 329—162 |
| 2,954,468 | 9/1960 | Matthaei | 333—84 |
| 3,041,543 | 6/1962 | Papp | 329—162 |
| 3,111,634 | 11/1963 | Ammerman et al. | 333—84 |

ARTHUR GAUSS, *Primary Examiner.*

J. JORDAN, *Assistant Examiner.*